(12) United States Patent
Lee et al.

(10) Patent No.: US 10,272,875 B2
(45) Date of Patent: Apr. 30, 2019

(54) VEHICLE AND METHOD OF CONTROLLING THE VEHICLE

(71) Applicant: HYUNDAI MOTOR COMPANY, Seoul (KR)

(72) Inventors: Jongyoung Lee, Seongnam-si (KR); Jihye Lee, Sokcho-si (KR); Sinjung Kim, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/181,089

(22) Filed: Jun. 13, 2016

(65) Prior Publication Data
US 2017/0217404 A1    Aug. 3, 2017

(30) Foreign Application Priority Data

Feb. 1, 2016    (KR) .......................... 10-2016-0012254

(51) Int. Cl.
*B60R 25/24*    (2013.01)
*H04L 29/08*    (2006.01)

(52) U.S. Cl.
CPC .............. *B60R 25/24* (2013.01); *H04L 67/12* (2013.01); *B60R 2325/10* (2013.01)

(58) Field of Classification Search
None
See application file for complete search history.

(56) References Cited

U.S. PATENT DOCUMENTS

| 5,412,379 A | * | 5/1995 | Waraksa | B60R 25/24 340/5.26 |
| 9,104,537 B1 | | 8/2015 | Penilla et al. | |
| 2006/0145811 A1 | * | 7/2006 | Nantz | B60R 25/209 340/5.72 |
| 2007/0268110 A1 | * | 11/2007 | Little | B60R 25/2072 340/5.62 |
| 2009/0096576 A1 | * | 4/2009 | Oman | G07C 5/008 340/5.62 |
| 2011/0218709 A1 | * | 9/2011 | Hermann | B60R 25/20 701/45 |
| 2016/0232727 A1 | * | 8/2016 | Wang | G07C 9/00309 |
| 2017/0096122 A1 | * | 4/2017 | Khan | B60R 25/24 |

FOREIGN PATENT DOCUMENTS

| JP | 2000-054699 A | 2/2000 |
| JP | 2006-016770 A | 1/2006 |
| JP | 2007-146501 A | 6/2007 |
| KR | 10-2014-0052099 A | 5/2014 |
| KR | 10-1455801 B1 | 11/2014 |
| KR | 10-1533428 B1 | 7/2015 |

* cited by examiner

*Primary Examiner* — Tamara L Weber
(74) *Attorney, Agent, or Firm* — Morgan Lewis & Bockius LLP

(57) ABSTRACT

A vehicle includes a communicator for performing a radio frequency communication and another radio frequency communication with a smart key, and a controller for setting a plurality of vehicle controlled regions each having a preset range from a vehicle, estimating a position of a driver by using the radio frequency communication and the other radio frequency communication with the smart key, and setting a detection period of a Radio Frequency (RF) signal to be transmitted to the smart key based on a vehicle controlled region in which the driver is positioned, among the plurality of vehicle controlled regions.

15 Claims, 11 Drawing Sheets

| EVENT | DETECTION PERIOD |
|---|---|
| $A_1 \rightarrow A_1$ | $T_1$ |
| $A_1 \rightarrow A_2$ | $T_1$ |
| $A_2 \rightarrow A_2$ | $T_2$ |
| $A_2 \rightarrow$ OUTSIDE | $T_2$ |
| $A_1 \rightarrow$ OUTSIDE | $T_2$ |

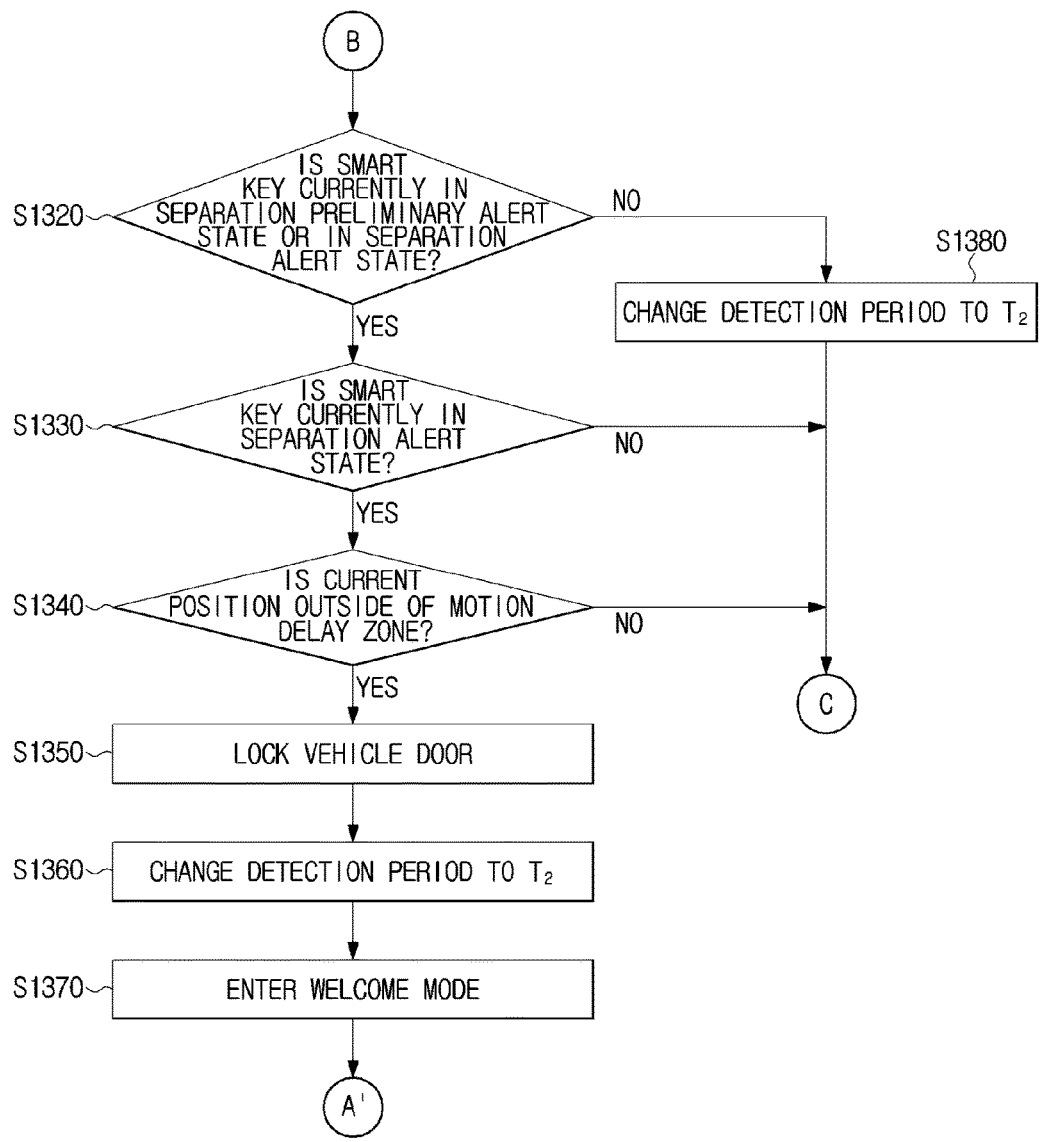

VEHICLE AND METHOD OF CONTROLLING THE VEHICLE

CROSS-REFERENCE TO RELATED APPLICATIONS

This application claims the priority benefit of priority to Korean Patent Application No. 10-2016-0012254, filed on Feb. 1, 2016 with the Korean Intellectual Property Office, the disclosure of which is incorporated herein by reference.

TECHNICAL FIELD

Embodiments of the present disclosure relate to a vehicle and a method of controlling the vehicle.

BACKGROUND

A smart key may allow a driver to open and close a vehicle door or start a vehicle engine without having to insert a key into a key box, or ignition, or perform additional manipulation for operation. Examples of the smart key may include a smart card that is easy to carry or a smart key for a wireless communication, such as a fob.

When a driver carrying a smart key approaches a vehicle, the smart key may perform a radio frequency communication and another radio frequency communication between the vehicle and the smart key such that a locking mechanism is automatically released. As a result, the driver may open the door without inserting an additional key, and may start the engine without inserting a starting key after entering into the vehicle.

SUMMARY

Therefore, it is an aspect of the present disclosure to provide a vehicle capable of determining whether a driver is separated from a vehicle based on the distance between a smart key and the vehicle and changing a transmission period of an LF signal, and a method of controlling the same.

Additional aspects of the disclosure will be set forth in part in the description which follows and, in part, will be obvious from the description, or may be learned by practice of the disclosure.

In accordance with one aspect of the present disclosure, a vehicle includes a communicator and a controller. The communicator may be configured to perform a radio frequency communication and another radio frequency communication with a smart key. The controller may be configured to set a plurality of vehicle controlled regions each having a preset range from a vehicle, estimate a position of a driver by using the radio frequency communication and the other radio frequency communication with the smart key, and set a detection period of an Radio Frequency (RF) signal to be transmitted to the smart key based on a vehicle controlled region in which the driver is positioned, among the plurality of vehicle controlled regions.

A frequency band of the other radio frequency communication may be higher than the frequency band of the radio frequency communication.

The controller may increase the detection period of the RF signal as the vehicle controlled region in which the driver is positioned among the plurality of vehicle controlled regions is farther from the vehicle.

The controller may estimate a speed of the driver by using information about a previous position of the driver measured at a previous detection point of time and a current position of the driver measured at a present point of time, and set the detection period of the RF signal based on the estimated speed.

The controller may calculate a next prediction position of the driver based on the estimated speed, determine a vehicle controlled region corresponding to the next prediction position among the plurality of vehicle controlled regions, and set the detection period of the RF signal based on the determined vehicle controlled region.

The controller may set a motion delay zone based on the next prediction position and the current position of the driver, and set the detection period of the RF signal based on whether the driver is separated from the motion delay zone.

The controller may lock a door lock of the vehicle based on the number of occurrences of no reception of other RF signals from the smart key and based on whether the driver is separated from the motion delay zone.

The controller may estimate the position of the driver based on RF signal intensity information received by the communicator from the smart key.

The position of the driver may correspond to a distance between the vehicle and the smart key.

The plurality of vehicle controlled regions may include a first region and a second region that is farther than the first region from the vehicle, and the controller may predict a next position of the driver, and when the driver is predicted to move from the first region to the second region, lock the door lock of the vehicle.

The controller may set a motion delay zone based on a current position and the next prediction position of the driver, and when the driver is predicted to be separated from the motion delay zone and move to the second region, may lock the door lock of the vehicle.

In accordance with another aspect of the present disclosure, a method of controlling a vehicle, the method including: performing a radio frequency communication and another radio frequency communication with a smart key; estimating a position of a driver by using the radio frequency communication and the other radio frequency communication with the smart key; and setting a detection period of an Radio Frequency (RF) signal to be transmitted to the smart key by determining a vehicle control region in which the driver is positioned among a plurality of vehicle control region each having a preset range from the vehicle, and by using a result of the determination.

The setting of the detection period of the RF signal may include increasing the detection period of the RF signal as the vehicle controlled region in which the driver is positioned among the plurality of vehicle controlled regions is farther from the vehicle.

The estimating of the position may include estimating a speed of the driver by using information about a previous position of the driver measured at a previous detection point of time and a current position of the driver measured at a present point of time, and the setting of the detection period of the RF signal may include setting the detection period of the RF signal based on the speed of the driver.

The estimating of the position may further include calculating a next prediction position of the driver based on the estimated speed, and determining a vehicle controlled region corresponding to the next prediction position among the plurality of vehicle controlled regions, and the setting of the detection period of the RF signal may further include setting the detection period of the RF signal based on the determined vehicle controlled region.

The estimating of the position may further include setting a motion delay zone based on the next prediction position and the current position of the driver, and the setting of the detection period of the RF signal may further include setting the detection period of the RF signal based on whether the driver is separated from the motion delay zone.

The method may further include locking a door lock of the vehicle based on the number of occurrences of no reception of other RF signals from the smart key and based on whether the driver is separated from the motion delay zone.

The estimating of the position of the driver may include estimating the position of the driver based on RF signal intensity information received from the smart key.

The position of the driver may correspond to a distance between the vehicle and the smart key.

The plurality of vehicle controlled regions may include a first region and a second region that is farther than the first region from the vehicle, the method further including predicting a next position of the driver, and when the driver is predicted to move from the first region to the second region, locking the door lock of the vehicle.

The locking of the door lock may include setting a motion delay zone based on a current position and the next prediction position of the driver, and when the driver is predicted to be separated from the motion delay zone and move to the second region, locking the door lock of the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is a mapping table showing LF signal detection periods according to positions of a driver stored in a vehicle according to an embodiment of the present disclosure; and FIGS. 9 to 11 are flowcharts showing methods of controlling a vehicle according to embodiments of the present disclosure.

DETAILED DESCRIPTION

Figure 1:
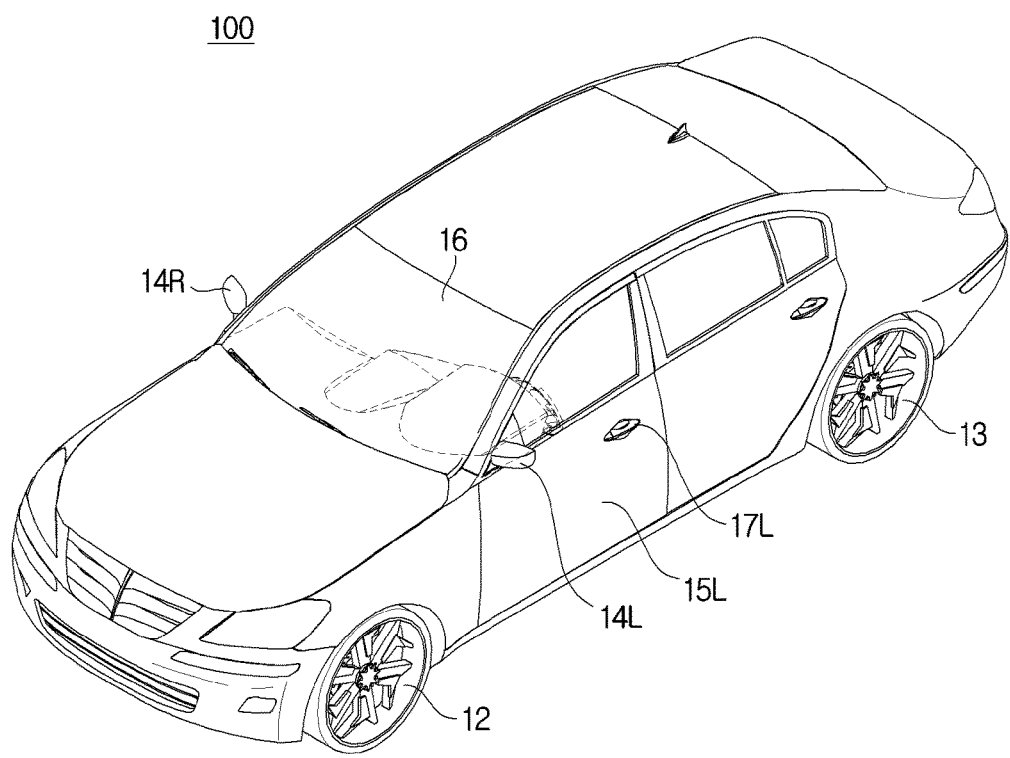
FIG. 1 is a diagram illustrating an external appearance of a vehicle according to an embodiment of the present disclosure.

The above objects and other advantages, and novel teaching of the present disclosure will become readily apparent by reference to the following detailed description when considered in conjunction with the accompanying drawings. In assigning reference numerals to elements, the same reference numerals are used to designate the same elements throughout the drawings, and in describing the present disclosure, detailed descriptions that are well-known but are likely to make the subject matter of the present disclosure unclear will be omitted in order to avoid redundancy. In the specification, the terms first, second, etc. are only used to distinguish one element from another, and these elements should not be limited by these terms.

Figure 2:
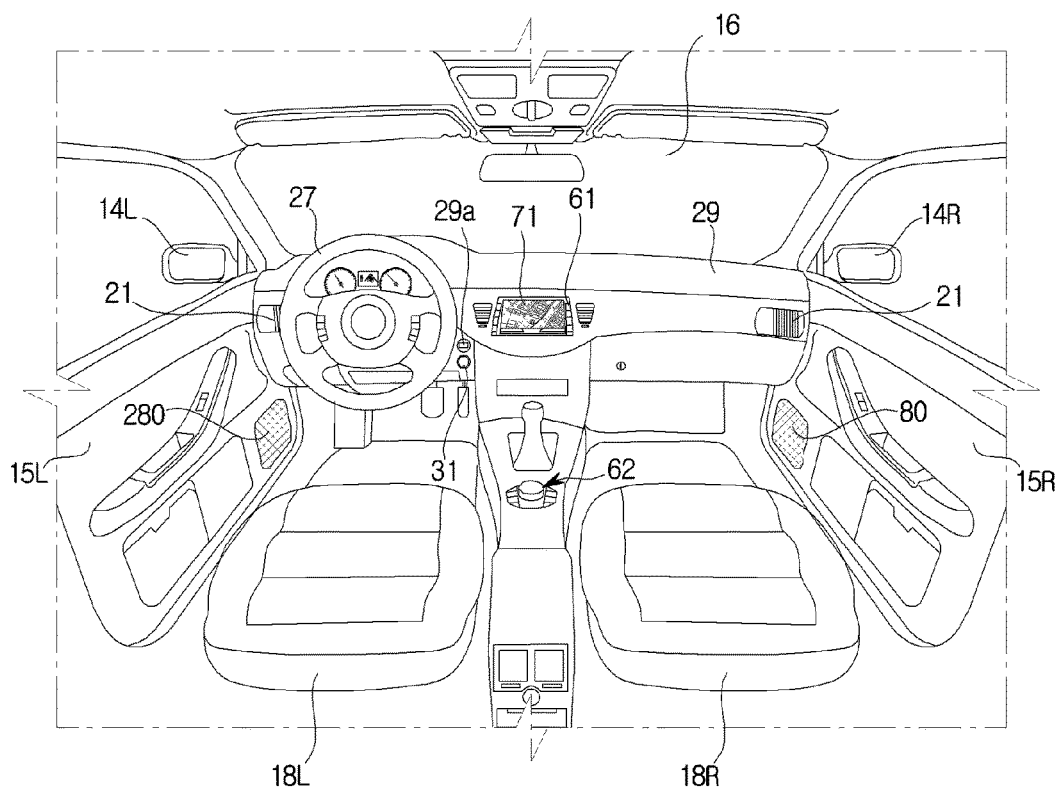
FIG. 2 is a diagram illustrating an internal configuration of a vehicle according to an embodiment of the present disclosure.

FIG. 1 is a diagram illustrating an external appearance of a vehicle according to an embodiment of the present disclosure, and FIG. 2 is a diagram illustrating an internal configuration of a vehicle according to an embodiment of the present disclosure.

Referring to FIG. 1, a vehicle 100 according to an embodiment may include wheels 12 and 13 to move the vehicle 100, a door 15L to isolate an internal space of the vehicle 100 from an external environment, a front glass 16 to provide a view in front of the vehicle 100 to a driver, and side-view mirrors 14L and 14R to provide a view behind the vehicle 100 to the driver.

The wheels 12 and 13 include front wheels 12 provided at a front part of the vehicle 100 and rear wheels 13 provided at a rear part of the vehicle 100, and the drive unit (not shown) provided inside the vehicle 100 provides torque to the front wheels 12 and/or the rear wheels 13 to move the vehicle 100 in the forward or backward direction. The drive unit may use an engine to generate torque by burning fossil fuels or a motor to generate torque by receiving electricity from a capacitor and/or a battery (not shown).

The doors (15L and 15R in FIG. 2) are rotatably provided at left and right sides of the vehicle 100 to allow the driver to get in and out of the vehicle 100 in an open state thereof and to isolate the internal space of the vehicle 100 from an external environment in a closed state thereof. In addition, the vehicle 100 may be provided at an outer part thereof with a knob 17L that is grasped when opening and closing the doors (15L and 15R in FIG. 2), and an LF antenna (not shown) may be installed on the knob 17L to transmit a Low Frequency (LF) signal.

When an authentication between a smart key (200 in FIG. 3) and the vehicle 100 is completed through a wireless communication network, a door lock of the vehicle 100 may be released, and the door 15 may be opened by a user's manipulation of pulling the knob 17L.

The front glass 16 is provided at a top front part of a body of the vehicle 100 such that the driver inside the vehicle 100 acquires visual information in front of the vehicle 100, and is referred to as a windshield glass.

In addition, the side-view mirrors 14L and 14R include a left side-view mirror 14L provided at the left side of the vehicle 100 and a right side-view mirror 14R provided at the right side of the vehicle 100, allowing the driver inside the vehicle 100 to acquire visual information beside or behind the vehicle 100.

In addition, the vehicle 100 may include sensing devices such as a proximity sensor to sense an obstacle or another vehicle behind the vehicle 100, and a rain sensor to sense rain and an amount of rain.

The proximity sensor may transmit a sensing signal to a side or the back of the vehicle 100, and receive a reflection signal reflected from an obstacle such as another vehicle. The proximity sensor may sense whether an obstacle exists behind the vehicle 100, and detect the location of the obstacle based on the waveform of the received reflection signal. The proximity sensor may use a scheme for transmitting ultrasonic waves or infrared rays and detecting the distance to an obstacle using the ultrasonic waves or infrared rays reflected from the obstacle.

Referring to FIG. 2, a dash board 29 is provided in the center portion thereof including an Audio Video Navigation (AVN) display 71 and an AVN input unit 61. The AVN display 71 may selectively display at least one of an audio screen, a video screen and a navigation screen, and may display various control screens related to the vehicle or a screen related to an additional function.

The AVN display 71 may be implemented as a liquid crystal display (LCD), a light emitting diode (LED), a plasma display panel (PDP), an organic light emitting diode (OLED), a cathode ray tube (CRT), etc.

The AVN input unit 61 may be provided near the AVN display 71 in the form of hard keys. Alternatively, if the AVN display 71 is implemented as a touchscreen, the AVN input unit 61 may be provided on a front surface of the AVN display 71 in the form of a touch panel.

In addition, a center input unit 62 in the form of a jog shuttle may be provided between a driver's seat 18L and a passenger's seat 18R. By pressing or rotating the center input unit 62 or pushing the center input unit 62 in upper side and lower side directions or left side and right side directions, a user may input a control command.

A sound output unit 80 may be provided in the vehicle 100 to output sound, and the sound output unit 80 may be a speaker. The sound output unit 80 may output sound necessary for performing an audio function, a video function, a navigation function, and other functions.

A steering wheel 27 may be provided on a portion of the dash board 29 adjacent to the driver seat 18L, and a key groove 29a may be provided on a portion of the dash board 29 adjacent to the steering wheel 27 such that the smart key (200 in FIG. 3), for example, a FOB key, is inserted into the key groove 20a. When the smart key 200 is inserted into the key groove 29a or an authentication between the smart key 200 and the vehicle 100 through a wireless communication is completed, the smart key 200 may be connected to the vehicle 100.

In addition, the vehicle may further include a starting button 31 to control an on/off operation of the starting of the vehicle 100, and when the smart key 200 is inserted into the key groove 29a or an authentication between the smart key 200 and the vehicle 100 through a wireless communication is completed, the starting of the vehicle 100 may be initiated when a user presses the starting button 31.

Meanwhile, the vehicle 100 may include an air conditioning apparatus to heat or cool the vehicle 100, which may control the temperature in the vehicle 100 by discharging heated or cooled air through a ventilation opening 21.

Figure 3:
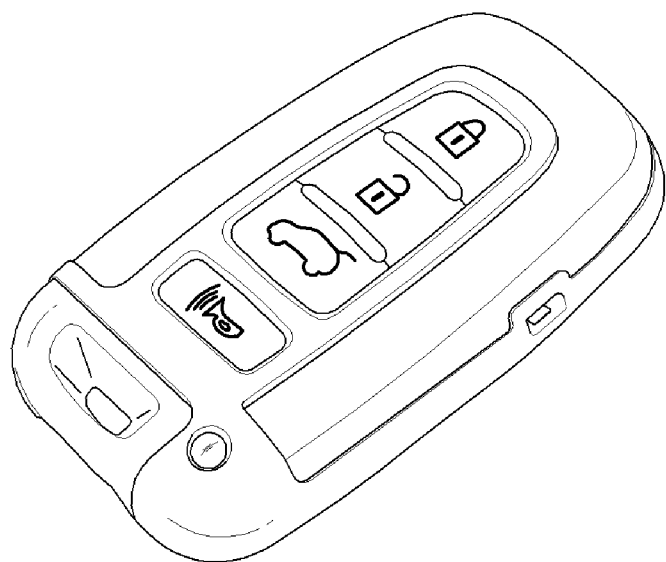
FIG. 3 is a diagram illustrating a smart key according to an embodiment of the present disclosure.

FIG. 3 is a diagram illustrating a smart key according to an embodiment of the present disclosure.

The smart key 200 may be connected to the vehicle 100 through transmission and reception of wired signals or wireless signals.

As illustrated in FIG. 3, the smart key 200 may be a FOB key that is configured to release a door lock or enable a starting or traveling of the vehicle while being connected to the vehicle 100 in a wired or wireless scheme.

According to the present disclosure, the smart key 200 is not limited to a FOB key and may include various devices as long as the smart key 200 can control the vehicle 100 with regard to releasing a door lock mechanism or enabling starting and travelling of the vehicle. For example, when a smart key is implemented as a mobile device, the smart key 200 according to the present disclosure may include a mobile device. In this case, the mobile device may have an application installed thereon to execute an operation of the smart key 200, and the mobile device may be purchased with the application installed thereon, or the application may be downloaded from a server after the purchase of the mobile device. In addition, when the mobile device serves as the smart key 200 for the vehicle 100, an authentication procedure may be performed.

The smart key 200 may be purchased together with the vehicle 100, and authentication information for the connection with the vehicle 100 may be previously stored in the smart key 200.

In order for the smart key 200 and the vehicle 100 to perform an authentication procedure therebetween, the smart key 200 and the vehicle 100 may transmit and receive signals therebetween through an LF communication network and/or an RF communication network.

The LF communication network may be a radio frequency band communication network that has a low frequency band used to transmit LF signals that scan the smart key 200, for example, a communication network having a frequency band of 20 kHz or above and 135 kHz or below. When LF signals are transmitted and received through the LF communication network, due to characteristics of the low frequency band, the signal transmission/reception range may be shorter than that of the RF communication network having a high frequency band. For example, an LF signal transmission/reception range may be about 12 m, and an RF signal transmission/reception range may be about 100 m.

Accordingly, the vehicle 100 may scan the smart key 200 adjacent to the vehicle 100 by transmitting an LF signal through the LF communication network.

The RF communication network may be another radio frequency band communication network that has a higher frequency band than the LF communication network, which is used when the vehicle 100 receives RF signals from the smart key 200 that has received LF signals, for example, a communication network having a frequency band of 315 MHz or above and, or to, 433 MHz or below. When RF signals are transmitted and received through the RF communication network, a signal transmission/reception range may be greater than that in the LF communication network having a low frequency band.

The LF signal may include a scanning signal to detect the smart key 200 positioned around the vehicle 100 (that is, within an LF signal transmission/reception range).

The RF signal may include a scanning acknowledgement signal that is a signal generated by the smart key 200 in response to the scanning signal.

Figure 4:
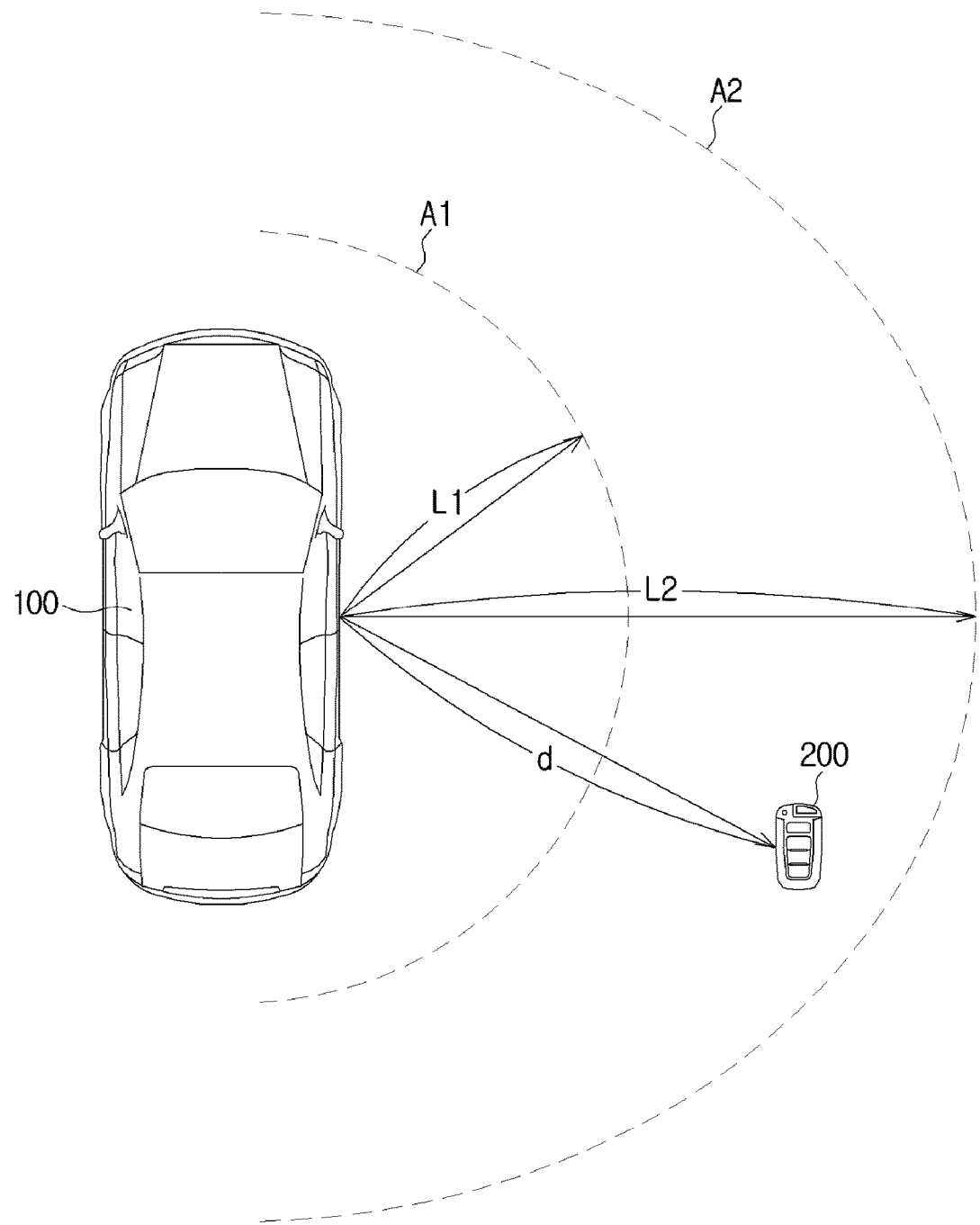
FIG. 4 is a diagram for describing a signal transmission/reception process between a vehicle and a smart key according to an embodiment of the present disclosure.

FIG. 4 is a diagram for describing a signal transmission/reception process between a vehicle and a smart key according to an embodiment of the present disclosure.

Referring to FIG. 4, when the smart key 200 exists within an LF signal transmission/reception range from the vehicle 100 and includes an LF antenna, the smart key 200 may receive an LF signal from the vehicle 100 through the LF communication network, and may transmit an RF signal to the vehicle 100 through the RF communication network. In this case, the smart key 200 may measure the intensity of the LF signal transmitted from the vehicle 100, and information about the intensity of the LF signal may be included in the RF signal and sent to the vehicle 100. The vehicle 100 may estimate the distance d between a driver carrying the smart key 200 and the vehicle 100 based on the intensity information of the LF signal.

However, when the smart key 200 does not exist within the transmission/reception range from the vehicle 100, the smart key 200 may not be able to receive an LF signal even if the vehicle 100 transmits LF signals to the surrounding area through the LF communication network. Accordingly, the smart key 200 may not transmit an RF signal to the vehicle 100.

In addition, when the smart key 200 includes a three dimensional LF antenna, the smart key 200 may determine not only the intensity but also the transmission direction of the LF signal transmitted from the vehicle 100. In this case, the smart key 200 may transmit information about the LF signal intensity and LF signal direction to the vehicle 100 through the RF communication network, and the controller 140 of the vehicle 100 may detect not only the distance of the driver carrying the smart key 200 from the vehicle 100 but also the relative position of the driver with respect to the vehicle 100 based on the information about the LF signal intensity and LF signal direction.

For the convenience of description, the following description will be made on the assumption that the distance between the vehicle 100 and the smart key 200 corresponds to the position of the driver relative to the vehicle.

According to an embodiment, the controller (140 in FIG. 5) of the vehicle 100 may set a plurality of vehicle controlled regions A1 and A2 each having a preset range from the vehicle 100. Hereinafter, the following description will made in relation that a first region A1 adjacent to the vehicle 100 and a second region A2 distant from the vehicle 100 are set as examples.

The first region A1 may represent a region having a distance less than a first reference distance L1 from the vehicle 100, and the second region A2 may represent a region having a distance of the first reference distance L1 or greater and less than a second reference distance L2. The second region A2 may represent a range corresponding to a maximum distance with regard to transmitting and receiving LF signals. For example, the first reference distance L1 may be 1.5 m, and the second reference distance L2 may be 3 m.

In addition, the vehicle controlled regions A1 and A2 may be divided into various regions according to reference distances, other than the above-described two regions of the first region A1 and the second region A2.

When the smart key 200 is disposed in the first region A1, it may concluded that the distance between the vehicle 100 and the smart key 200 is less than the first reference distance L1, and when the smart key 200 is disposed in the second region A2, it may be concluded that the distance between the vehicle 100 and the smart key 200 is equal to or greater than the first reference distance L1 and less than the second reference distance L2. When the smart key 200 is disposed outside the second region A2, it may be concluded that the distance between the vehicle 100 and the smart key 200 is equal to or greater than the second reference distance L2.

Hereinafter, a detailed configuration of the vehicle 100 and the smart key 200 will be described.

Figure 5:
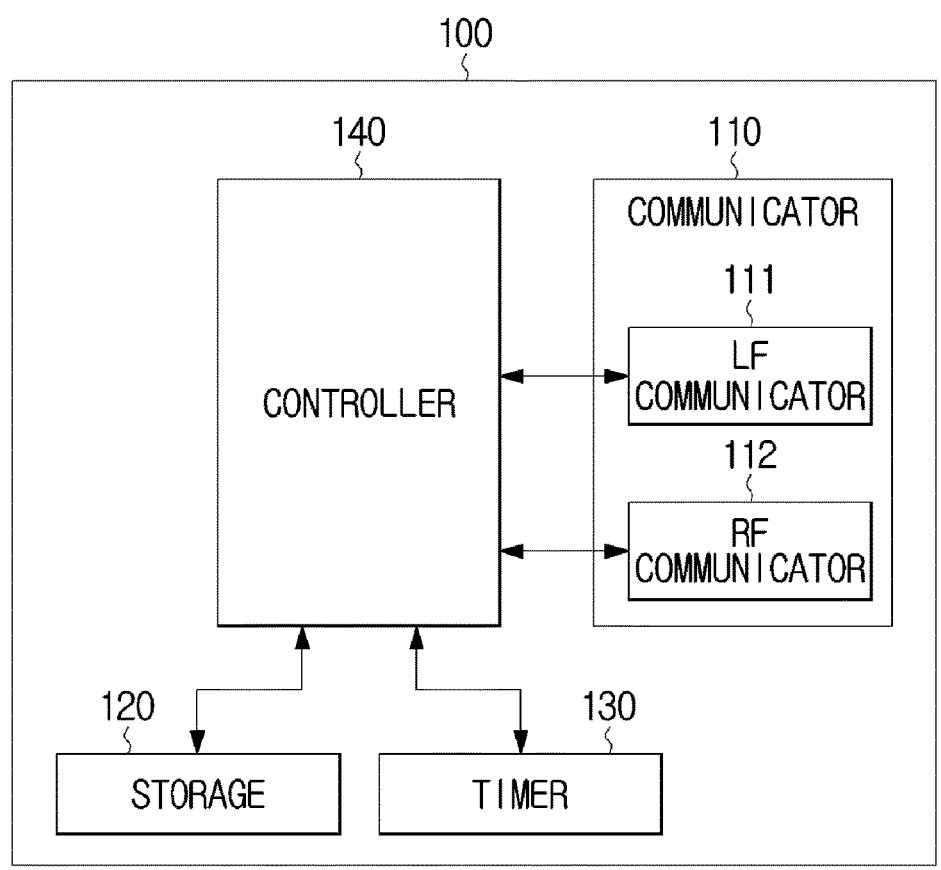
FIG. 5 is a control block diagram illustrating a vehicle according to an embodiment of the present disclosure.
Figure 6:
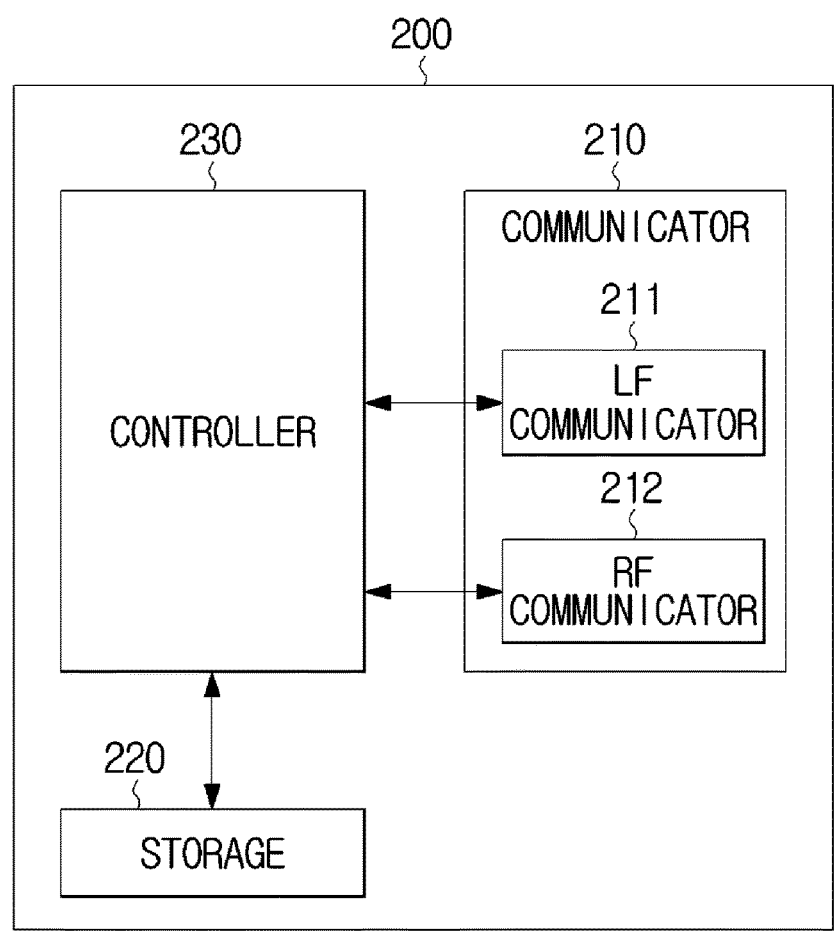
FIG. 6 is a control block diagram illustrating a smart key according to an embodiment of the present disclosure.

FIG. 5 is a control block diagram illustrating a vehicle according to an embodiment of the present disclosure, and FIG. 6 is a control block diagram illustrating a smart key according to an embodiment of the present disclosure.

Referring to FIG. 5, the vehicle 100 according to an embodiment may include a communicator 110 to transmit and receive signals to and from the smart key 200, a storage 120 to store data, a timer 130 to measure a time, and a controller 140 to control an operation of each component of the vehicle 100.

The communicator 110 of the vehicle 100 may include an LF communicator 111 to transmit an LF signal in an LF signal transmission/reception range through the LF communication network and an RF communicator 112 to transmit an RF signal in an RF signal transmission/reception range through the RF communication network.

The LF communicator 111 may transmit an LF signal at each period set by the controller 140 through the LF communication network to detect the smart key 200 existing at a surrounding area. The detection period of LF signals will be described later.

The LF communicator 111 may include an LF communication interface that may include a communication port connecting the LF communication network to the controller 140 and a transmitter transmitting an LF signal.

In addition, the LF communicator 111 may further include an LF signal conversion module to modulate a digital control signal output from the controller 140 through the LF communication interface into an analog LF signal according to a control of the controller 140.

The RF communicator 112 may receive an RF signal from the smart key 200 through the RF communication network.

The RF signal may be an acknowledgement signal transmitted from the smart key 200 having received an LF signal, and may include authentication information shared between the vehicle 100 and the smart key 200, and may include intensity information and direction information of the LF signal received by the smart key 200.

The RF communicator 112 may include an RF communication interface that includes a communication port connecting the RF communication network to the controller 140 and a receiver receiving an RF signal.

In addition, the RF communicator 112 may further include an RF signal conversion module to modulate an analog RF signal received through the RF communication interface into a digital control signal.

The control signal, the RF signal and the LF signal of the vehicle 100 may have different formats from each other.

The storage 120 may store authentication information shared between the smart key 200 and the vehicle 100, and store an LF signal detection period table according to the distances of the driver, which may be the distances between the vehicle 100 and the smart key 200. The LF signal detection period table according to the distances between the vehicle 100 and the smart key 200 will be described later.

The storage 120 may include a memory that stores a program and data for controlling components of the vehicle 100.

According to embodiments, the storage 120 and the controller 140 may be implemented as a memory device and a processor separated from each other, or may be implemented in a single device.

The timer 130 may measure the current time. The LF communicator 111 may transmit an LF signal for detecting the smart key 200 at a preset period set by the controller 140 based on the time measured by the timer 130.

The timer 130 may provide the AVN display (71 in FIG. 2) with the measured time.

The controller 140 may control the components included in the vehicle 100. The controller 140 may include a processor that generates a control signal according to the program and data stored in the storage 120.

The controller 140 according to an embodiment may estimate the position of the driver carrying the smart key 200 (that is, the distance between the vehicle 100 and the smart key 200) based on the LF signal intensity information included in the RF signal.

In addition, the controller 140 may fetch a driver position-specific LF signal detection period mapping table stored in the storage 120, and set an LF signal detection period corresponding to the estimated position of the driver based on the LF signal intensity information included in the RF signal, and allow the LF communicator 111 to transmit an LF signal according to the set LF signal detection period.

In addition, the controller 140 may estimate the speed of the driver by using information about the previous position of the driver measured in a previous detection point of time and the current position of the driver.

In addition, the controller 140 may calculate a next prediction position of the driver based on the estimated speed of the driver, and calculate a motion delay zone based on information about the next prediction position and the current position. The motion delay zone may represent a reference zone for determining whether a driver vehicle has a likelihood of separation, and when a driver is separated from the motion delay zone, the controller 140 of the vehicle 100 may lock the door lock.

For example, a driver being separated from the motion delay zone may include a driver moving fast to be far away from the vehicle 100, and a driver staying in the motion delay zone may include a driver being in a phone conversation at a location adjacent to the vehicle 100.

Accordingly, the controller 140 may lock or release the door lock of the vehicle 100 depending on the vehicle controlled region where the driver is positioned and depending on whether the driver is separated from the motion delay zone.

Detailed operation of the controller 140 will be described below.

Referring to FIG. 6, the smart key 200 according to an embodiment of the present disclosure may include a communicator 210 for transmitting and receiving signals to and from the vehicle 100, a storage 220 for storing data, and a controller 230 for controlling operations of components of the smart key 200.

The communicator 210 of the smart key 200 may include an LF communicator 211 for receiving LF signals in an LF reception range through the LF communicator network, and an RF communicator 212 for transmitting RF signals in an RF reception range through the RF communicator network.

The LF communicator 211 may receive an LF signal through the LF communicator network.

The LF communicator 211 may include an LF communication interface that includes a communication port for connecting the LF communicator network to the controller 230 of the smart key 200 and a receiver for receiving an LF signal. The receiver for receiving an LF signal may include a 3D LF antenna, and the 3D LF antenna may detect the intensity and direction of an LF signal. Since the 3D LF antenna is generally known in the art, a detailed description thereof will be omitted.

In addition, the LF communicator 211 may further include an LF signal conversion module to demodulate an analog LF signal received through the LF communication interface into a digital control signal.

The RF communicator 212 may transmit an RF signal corresponding to the LF signal to the vehicle 100 through the RF communication network. The RF signal may include authentication information shared between the vehicle 100 and the smart key 200, and include information about intensity and direction of the LF signal detected by the 3D LF antenna.

In addition, the RF communicator 212 may further include an RF signal conversion module to modulate a digital control signal output from the controller 230 through the RF communication interface into an analog RF signal according to a control of the controller 230.

The control signal, the RF signal and the LF signal of the smart key 200 may have different formats from each other.

The storage 220 may store authentication information shared between the smart key 200 and the vehicle 100.

According to embodiments of the present disclosure, the storage 220 and the controller 230 may be implemented as a memory device and a processor separated from each other, or may be implemented in a single device.

The controller 230 may control components included in the smart key 200.

The controller 230 may determine whether authentication information of the vehicle 100 included in an LF signal is identical to authentication information included in the smart key 200, and only when the authentication information of the vehicle 100 is identical to the authentication information of the smart key 200, the controller may transmit an RF signal to the vehicle 100.

The controller 230 may estimate the position of a driver with respect to the vehicle 100 (that is, the distance between the vehicle 100 and the smart key 200), based on the intensity information of a detected LF signal, and may transmit the estimated position information to the vehicle 100 through the RF communicator network. However, for the convenience of description, the following description will be made in relation that, or assuming that, the position estimation is performed by the vehicle 100 as an example.

The controller 230 may include a processor that generates a control signal according to program and data stored in the storage 220.

Hereinafter, a process of the controller 140 of the vehicle 100 estimating the speed of the driver based on the position of the driver, setting an LF signal detection period and setting a motion delay zone according to an embodiment of the vehicle 100 will be described with reference to FIGS. 7 and 8.

Figure 7:
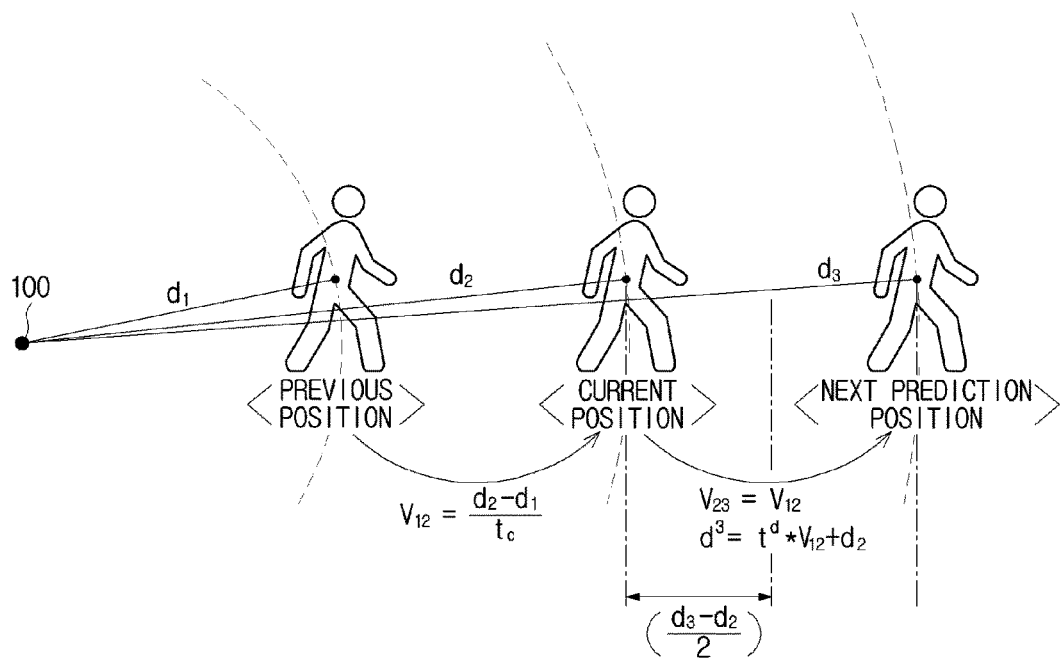
FIG. 7 is a diagram showing a method of a vehicle calculating a speed of a driver, a next prediction position of a driver and a motion delay zone according to an embodiment of the present disclosure.

FIG. 7 is a diagram illustrating a method of a vehicle calculating a speed of a driver, a next prediction position and a motion delay zone according to an embodiment of the present disclosure, and FIG. 8 is a mapping table about LF signal detection periods according to positions of a driver, the mapping table being stored in a vehicle according to an embodiment of the present disclosure.

Referring to FIG. 7, the LF communicator 111 of the vehicle 100 may transmit an LF signal at each detection period td set by the controller 140. The LF communicator 211 of the smart key 200, having received the LF signal from the vehicle 100, may transmit an RF signal corresponding to the LF signal of the vehicle 100 to the vehicle 100. When the RF communicator 112 of the vehicle 100 receives the RF signal from the smart key 200, the controller 140 of the vehicle 100 may estimate the distance between the vehicle 100 and the smart key 200, that is, the position of a driver, based on LF signal intensity information included in the RF signal.

When a previous position (that is, the distance between the vehicle 100 and the smart key 200) of the driver estimated at a previous detection point of time is d1, the current position of the driver estimated at the current point of time after an elapse of the detection period td is d2, and a next prediction position of the driver estimated at a following point of time after an elapse of the detection period td is d3, the controller 140 of the vehicle 100 may calculate the speed of the driver $v12=(d2-d1)/td$ based on information the current position d2 and the previous position d1.

In addition, the controller 140 of the vehicle 100 may estimate the next prediction position of the driver $d3=td \times v12+d2$ based on the calculated speed of the driver.

In addition, the controller 140 of the vehicle 100 may calculate a motion delay zone d2+(d3−d2)/2 based on information about the estimated next prediction position d3 and the current position d2.

In addition, the controller 140 of the vehicle 100 may change the detection period for transmitting an LF signal from the LF communicator 111 according to the change in position of the driver.

In detail, the controller 140 of the vehicle 100 may set the LF signal detection period td based on a vehicle controlled region including the current position d2 of the driver and a vehicle controlled region including the next prediction position d3 of the driver.

Referring to FIG. 8, the mapping table of LF signal detection periods according to a change in position of a driver may be stored in the storage 120 of the vehicle 100.

For example, the storage 120 may store information about changing to T1 when a driver moves in the first region A1 or moves from the first region A1 to the second region A2 during a previously set detection period, and information about changing to T2 when a driver moves in the second region A2, moves from the second region A2 to the outside or moves from the first region A1 to the outside during a previously set detection period. T2 may be set to be greater to T1. Although not shown, the storage 120 may store information about changing the detection period to T3 when a driver is not detected (that is, when there is no reception of an RF signal). T3 may be set to be greater than T3, and as a driver is getting farther away from the vehicle, an LF transmission interval may be increased.

Hereinafter, a method of controlling the vehicle 100 will be described on the assumption that the LF signal detection periods according to the change in position of a driver are stored in the storage 120 as illustrated in FIG. 8.

Figure 9:
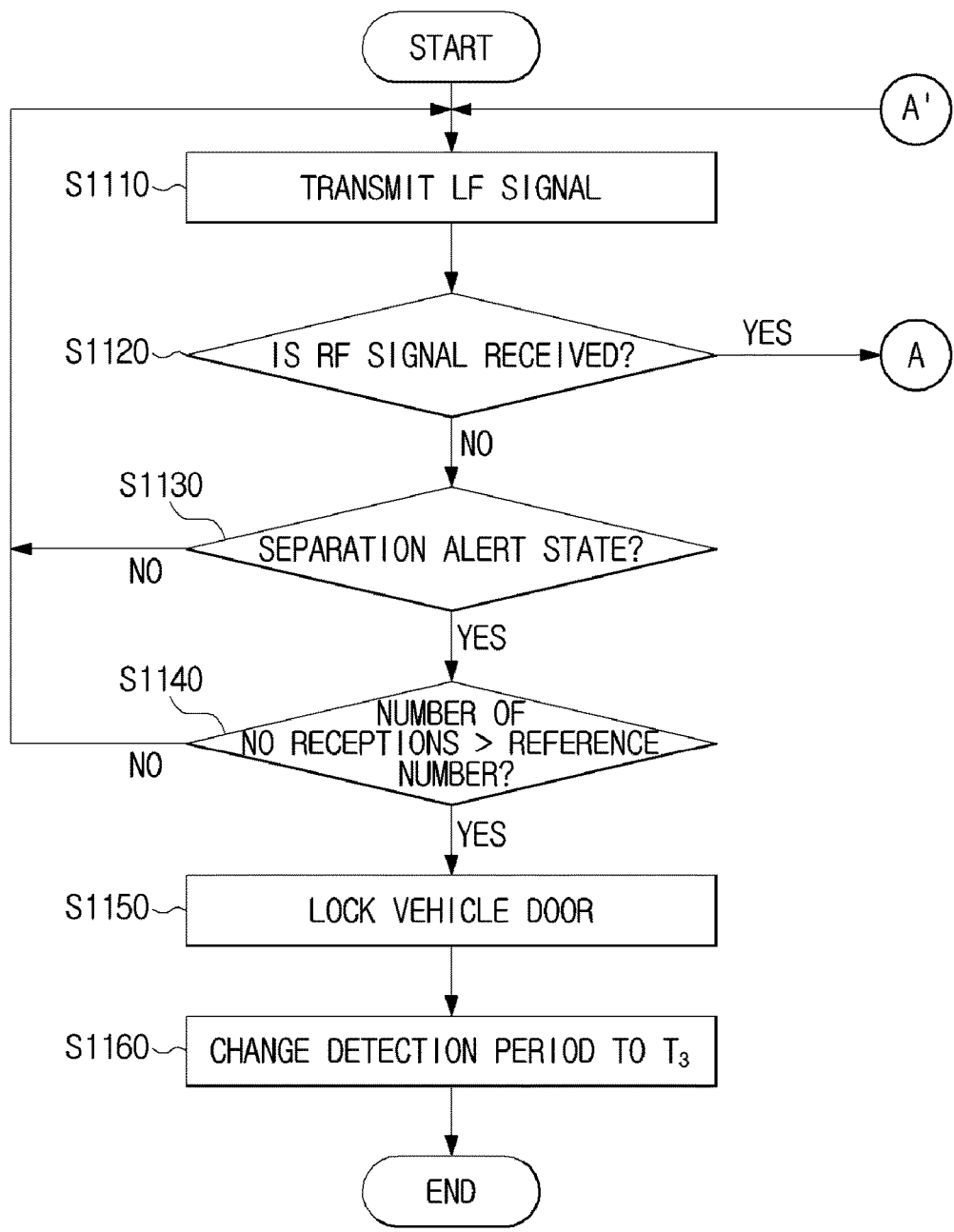
Figure 10:
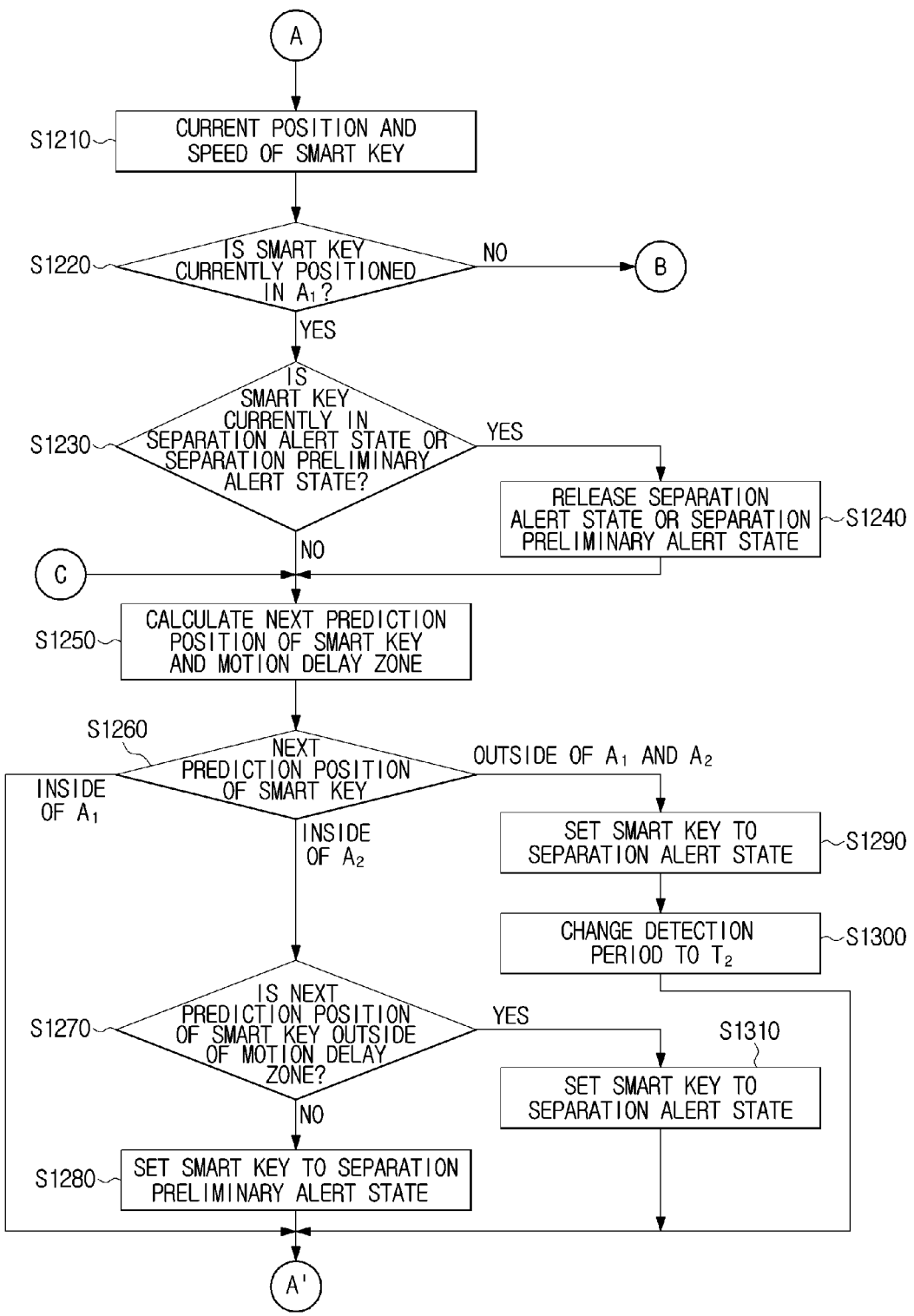

FIGS. 9 to 11 are flow charts showing a method of controlling a vehicle according to embodiments of the present disclosure.

First, the LF communicator 111 of the vehicle 100 transmits an LF signal at a previously set detection period (S1110). The previously set detection period may be previously set by the controller 140 of the vehicle 100.

Then, the controller 140 of the vehicle 100 may determine whether the RF communicator 112 has received an RF signal from the smart key 200 (S1120). The RF signal may include intensity information about an LF signal transmitted by the vehicle 100 at an immediately previous detection point of time. In addition, the RF signal may include authentication information shared between the smart key 200 and the vehicle 100.

When the RF communicator 112 of the vehicle 100 has not received an RF signal from the smart key 200 (NO from S1120), the controller 140 of the vehicle 100 may determine whether the driver is in a separation alert state (S1130).

The separation alert state may represent a driver's state set by the controller 140 when a driver is predicted to be separated from a preset motion delay zone, for example, when a driver moves fast from the first region A1 to the second region A2 or to the outside, when a driver moves fast from the second region A2 to the outside, when a driver is first detected in the second region A2 from the beginning due to interference with other devices, or when a driver moves to be far away from the vehicle 100 in a separation preliminary alert state.

The separation preliminary alert state may represent a driver's state set by the controller 140 when a driver is predicted to move from a preset motion delay zone.

The process of setting a separation alert state and a separation preliminary alert state will be described with reference to FIGS. 10 and 11 below.

Then, when a driver is in a separation alert state (YES from S1130), the controller 140 of the vehicle 100 may determine whether a number of occurrences of no reception of RF signals is equal to or greater than a reference number (S1140), and if the number of occurrences of no reception of RF signals is determined to be equal to or greater than the reference number, the controller 140 may lock the door lock of the vehicle (S1150) and change the LF signal detection period to T3 (S1160).

However, when the number of occurrences of no reception of RF signals is below the reference number, the vehicle 100 may repeat a process of transmitting LF signals (S1110) and determining reception of RF signals (S1120).

Meanwhile, when the RF communicator 112 has received an RF signal from the smart key 200 (YES from S1120), the controller 140 of the vehicle 100 may estimate the current position of the driver based on the LF signal intensity information (that is, the current position of the smart key 200), and calculate the speed of the driver based on the previous position of the driver that is, or has been, previously estimated, the current position of the driver, and the LF signal detection period that is, or has been, previously set (S1210).

Then, the controller 140 of the vehicle 100 may determine whether the driver is positioned in the first region A1 (S1220). When the driver is positioned in the first region (A1) (YES from S1220), the controller 140 of the vehicle 100 may determine whether the driver is currently in a separation alert state or in a separation preliminary alert state (S1230). The controller 140 may release the separation alert state when the driver is in a separation alert state, and may release the separation preliminary alert state when the driver is in a separation preliminary alert state (S1240).

Then, the controller 140 of the vehicle 100 may predict the next position of the driver based on the speed and the current position of the driver, and calculate the motion delay zone based on the current position and the next prediction position (S1250). The method of calculating the next prediction position and the current position may be the same as that described with reference to FIG. 7, and the description thereof will be omitted.

The controller 140 of the vehicle 100 may determine the next prediction position of the driver (that is, the next prediction position of the smart key 200) (S1260). When the next prediction position of the driver is the first region A1, it may be determined that the driver moves within the first region A1, so that operation S1110 transmitting LF signals described in FIG. 9 and operation S1120 determining whether RF signals have been received may be performed. However, when the next prediction position of the driver is the second region A2, the controller 140 of the vehicle 100 may determine whether the next prediction position is outside of the motion delay zone (S1270).

When it is determined that the next prediction position is outside of the motion delay zone (YES from S1270), the controller 140 of the vehicle 100 may set that the driver is in a separation alert state (S1310), and when it is determined that the next prediction position is not outside of the motion delay zone (NO from S1270), the controller 140 of the vehicle 100 may set that the driver is in a separation preliminary alert state (S1280).

However, when the next prediction position of the driver is not the first region A1 and the second region A2, (that is, the next prediction position of the driver is outside of the two regions), the controller 140 of the vehicle 100 may set that the driver is in a separation alert state (S1290), and change the LF signal detection period to T2 (S1300).

Meanwhile, when the driver is not currently positioned in the first region A1 (NO from S1220, that is, when the current position is the second region A2 or outside), the controller 140 of the vehicle 100 may determine whether the driver is currently in a separation preliminary alert state or a separation alert state (S1320).

When the driver is not in a separation preliminary alert state or a separation alert state (NO from S1320), the controller 140 of the vehicle 100 may change the LF signal detection period to T2 (S1380), and perform operation S1250 of predicting the next position of the driver and calculating the motion delay zone as illustrated in FIG. 10.

However, when the driver is in a separation preliminary alert state, the controller 140 of the vehicle 100 may perform operation S1250 of predicting the next position of the driver and calculating the motion delay zone as illustrated in FIG. 10 without changing the LF signal detection period.

When the driver is in a separation alert state (S1330), the controller 140 of the vehicle 100 may determine whether the current position of the driver is outside of the previously set motion delay zone (S1340). When the current position of the driver is outside of the previously set motion delay (YES from S1340), the controller 140 may lock the door lock of the vehicle zone (S1350), change the LF signal detection period to T2 (S1360), enter a welcome mode (S1370) and repeat operation S1110 of transmitting LF signals and operation S1120 of determining whether RF signals have been received as illustrated in FIG. 9. When the vehicle 100 enters a welcome mode, the vehicle 100 may flicker headlights or sidelights.

However, when the current position of the driver is not outside of the previously set motion delay (NO from S1340), the controller 140 may perform operation S1250 of predicting the next position of the driver and calculating the motion delay zone as illustrated in FIG. 10.

As is apparent from the above, the vehicle and the method of controlling the vehicle according to the disclosed embodiment can determine whether a driver carrying a smart key is separated from a vehicle by using an LF communication and an RF communication with respect to the smart key, and can change a detection period of an LF signal based on a result of the determination of whether the driver is separated from the vehicle.

In addition, the vehicle and the method of controlling the vehicle according to the disclosed embodiment can reduce power consumption of the vehicle with regard to transmitting LF signals by changing a detection period of an LF signal based on a result of the determination of whether the driver is separated from the vehicle.

Although some embodiments have been described, those skilled in the art will readily appreciate that many modifications are possible in embodiments without changing the inventive concept and essential features of the present disclosure. Therefore, it is to be understood that the foregoing is illustrative of embodiments and is not to be construed as limited to the specific embodiments disclosed. For example, each of the components having been described as a single form may be implemented in a distributed fashion over a network, and likewise, components having been described in a distributed fashion may be implemented in a combined form.

As for the scope of the disclosure, it is to be set forth in the following claims rather than the above specification, and it is intended that the present disclosure covers all such modifications provided they come within the scope of the appended claims and their equivalents, as well as other embodiments.

What is claimed is:

1. A vehicle comprising:
   a communicator configured to perform a radio frequency communication and another radio frequency communication with a smart key; and
   a controller configured to set a plurality of vehicle controlled regions each having a preset range from a vehicle, estimate a position of a driver by using the radio frequency communication and the other radio frequency communication with the smart key and estimate a speed of the driver by using information about a previous position of the driver measured at a previous detection point of time and a current position of the driver measured at a present point of time, and set a detection period of a Radio Frequency (RF) signal to be transmitted to the smart key based on a vehicle controlled region in which the driver is positioned, among the plurality of vehicle controlled regions and set the detection period of the RF signal based on the estimated speed,
   wherein the plurality of vehicle controlled regions includes a first region and a second region that is farther than the first region from the vehicle, and
   the controller predicts a next position of the driver, and when the driver is predicted to move from the first region to the second region, locks a door lock of the vehicle and changes the detection period of the RF signal based on the number of occurrences of no reception of other RF signals from the smart key.

2. The vehicle of claim 1, wherein the controller increases the detection period of the RF signal as the vehicle controlled region in which the driver is positioned among the plurality of vehicle controlled regions is farther from the vehicle.

3. The vehicle of claim 1, wherein the controller calculates a next prediction position of the driver based on the estimated speed, determines a vehicle controlled region corresponding to the next prediction position among the plurality of vehicle controlled regions, and sets the detection period of the RF signal based on the determined vehicle controlled region.

4. The vehicle of claim 3, wherein the controller sets a motion delay zone based on the next prediction position and the current position of the driver, and sets the detection period of the RF signal based on whether the driver is separated from the motion delay zone.

5. The vehicle of claim 4, wherein the controller locks a door lock of the vehicle based on the number of occurrences of no reception of other RF signals from the smart key and based on whether the driver is separated from the motion delay zone.

6. The vehicle of claim 1, wherein the controller estimates the position of the driver based on RF signal intensity information received by the communicator from the smart key.

7. The vehicle of claim 1, wherein the position of the driver corresponds to the position of the smart key.

8. The vehicle of claim 1, wherein the controller sets a motion delay zone based on a current position and the next prediction position of the driver, and when the driver is predicted to be separated from the motion delay zone and to move to the second region, the controller locks the door lock of the vehicle.

9. A method of controlling a vehicle, the method comprising:
performing a radio frequency communication and another radio frequency communication with a smart key;
estimating a position of a driver using the radio frequency communication and the other radio frequency communication with the smart key;
estimating a speed of the driver by using information about a previous position of the driver measured at a previous detection point of time and a current position of the driver measured at a present point of time; and
setting a detection period of an Radio Frequency (RF) signal to be transmitted to the smart key by determining a vehicle control region in which the driver is positioned among a plurality of vehicle control region each having a preset range from the vehicle, and by using a result of the determination, and setting the detection period of the RF signal based on the estimated speed,
wherein the plurality of vehicle controlled regions includes a first region and a second region that is farther than the first region from the vehicle,
the method further comprising predicting a next position of the driver, and when the driver is predicted to move from the first region to the second region, locking a door lock of the vehicle and changes the detection period of the RF signal based on the number of occurrences of no reception of other RF signals from the smart key.

10. The method of claim 9, wherein the step of setting the detection period of the RF signal comprises increasing the detection period of the RF signal as the vehicle controlled region in which the driver is positioned among the plurality of vehicle controlled regions is farther from the vehicle.

11. The method of claim 9, wherein the step of estimating the position further comprises calculating a next prediction position of the driver based on the estimated speed, and determining a vehicle controlled region corresponding to the next prediction position among the plurality of vehicle controlled regions, and
the step of setting the detection period of the RF signal further comprises setting the detection period of the RF signal based on the determined vehicle controlled region.

12. The method of claim 11, wherein the step of estimating the position further comprises setting a motion delay zone based on the next prediction position and the current position of the driver, and
the step of setting the detection period of the RF signal further comprises setting the detection period of the RF signal based on whether the driver is separated from the motion delay zone.

13. The method of claim 12, further comprising locking a door lock of the vehicle based on the number of occurrences of no reception of other RF signals from the smart key and based on whether the driver is separated from the motion delay zone.

14. The method of claim 9, wherein the step of estimating the position of the driver comprises estimating the position of the driver based on RF signal intensity information received from the smart key.

15. The method of claim 9, wherein the position of the driver corresponds to the position of the smart key.

* * * * *